June 25, 1929.  R. A. FREUNDLICH  1,718,346
MOVING EYE
Original Filed Sept. 26, 1924
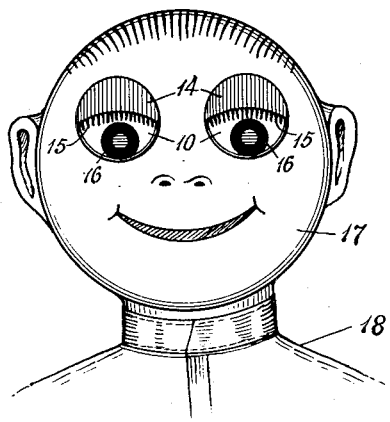
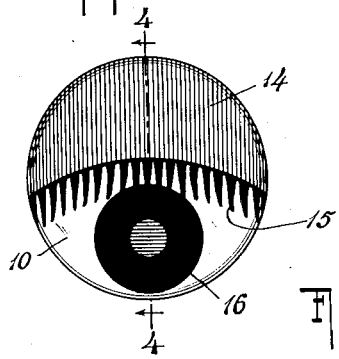
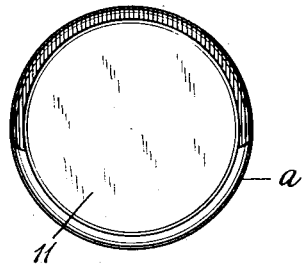
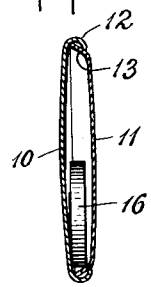
WITNESS
G. V. Rasmussen
INVENTOR
RALPH A. FREUNDLICH
BY
ATTORNEYS Patented June 25, 1929.

1,718,346

UNITED STATES PATENT OFFICE.

RALPH A. FREUNDLICH, OF BROOKLYN, NEW YORK.

MOVING EYE.

Application filed September 26, 1924, Serial No. 739,997. Renewed January 9, 1929.

My invention relates to moving eyes and has for its object to provide a unit constructed in a novel manner to simulate the eye of a human being or an animal and consisting of a hollow, double-faced member and an iris loosely mounted therein and movable in said member by gravity to produce grotesque effects. The invention further contemplates a unit of the indicated type in which one or both faces are made of transparent material and the front face is partly covered, as by means of a suitable closing applied either in the form of a coating or otherwise, to represent an eyelid and an eyelash. A still further object of the invention is to construct the unit in such a manner that it may be incorporated in a mask, doll, toy animals, and other toy figures or the like as the eyes thereof or used by being placed in front of the natural eyes of a human being either independently or in combination with a duplicate unit. Other objects of the invention, will appear from the description hereinafter and the features of novelty will be pointed out in the claims.

In the accompanying drawing, which shows an example of the invention and an application thereof without defining its limits, Fig. 1 is a view showing the novel unit incorporated in a doll's head as the eyes thereof; Fig. 2 is a front face view of the unit; Fig. 3 is a rear face view thereof and Fig. 4 is a sectional view on the line 4—4 of Fig. 2.

In its illustrated form, the unit is constructed in the form of a circular disc and comprises a hollow member *a* consisting of a front section 10 and a rear section 11 fitted together in any suitable manner; for instance, as shown in the drawing the periphery of the front section 10 may be shaped to form an annular recess 12 into which the bent periphery 13 of the rear section 11 is sprung. The front section 10 is slightly bowed to give it the general curvature of the eyeball. The sections 10 and 11 are preferably made of a material such as pyroxylin having an inherent stiffness sufficient to retain its form and yet being sufficiently flexible to permit the sections to be united in the indicated manner. The sections 10 and 11, which constitute the front and rear faces of the unit, may both be transparent or only the front section 10 may be transparent, dependent upon the use to which the unit is to be put.

In any case the front section 10 is partly covered, as by means of suitable coloring applied as a coating or otherwise, to represent an eyelid 14 and an eyelash 15 as shown in Figs. 1 and 2; the arrangement is such that the upper portion of the front section 10 is rendered either completely or partly opaque by the eyelid 14. In addition the unit includes a member 16 constructed in the form of a relatively smaller disk and colored or otherwise embellished to represent the iris of the eye; the iris disc 16 is contained within the hollow member and is loosely mounted between the front and rear sections 10 and 11 so as to be movable by gravity. In other words, the disc 16 is arranged to roll upon the interior circular surface of the hollow member and otherwise between said sections 10 and 11 without being restricted to any predetermined path of movement and is capable of unrestricted freedom limited only by the peripheral boundary of the unit. The proportions and arrangement of the parts are such that the iris disc 16 when shifted to the upper portion of the unit is either wholly or partly covered and hidden by the eyelid 14 and eyelash 15.

In the application of the unit illustrated in Fig. 1 it is incorporated in the head 17 of a doll 18 as the eyes thereof, the units being secured in position in any convenient manner. As the head 17 is moved about, the iris discs 16 will shift and roll about in the hollow member and between the sections 10 and 11 and thereby produce many different and ofttimes grotesque effects. The fact that the movements of the iris discs 16 in the hollow member are not confined to any fixed path therein increases the variety of effects which may be obtained; as previously stated the movements of the iris discs 16 are restricted only by the peripheral walls of the units but are otherwise free and unrestricted therein. The units may also be incorporated in toy animals and the like, in false faces and masks as the eyes thereof, the front and rear sections 10 and 11 in the latter cases being transparent, except perhaps as to those parts parts covered by the eyelids 14, to permit the wearer of the false face or mask to see through the same. Furthermore, the units may be independently used by being placed in the eye in the manner of a monocle, or in connected pairs in the form of eyeglasses or spectacles; in any case, the movements of the wearer will cause the eye discs to move about in a manner to produce a large variety of effects, humorous and otherwise.

The units are capable of being manufactured and produced in different forms at comparatively low cost and may be utilized in many different ways and in a great variety of combinations.

Various changes in the specific form shown and described may be made within the scope of the claims without departing from the spirit of my invention.

It will be obvious that the painting or coloring matter representing the eyelid and lash may be varied according to the impression which it is desired to give to the character to which the eyes are applied. Thus, the lower edge of the facing 10 may be colored to correspond to the eyelid and lash representation showing at 14 and 15 of the drawings leaving, instead of a large transparent area, a mere slit through which the iris is observable. In the type of doll head shown in Fig. 1 the hollow member is glued directly over the fabric face of the figure so that the eyes stand away from the face of the doll giving a "pop" eyed expression.

I claim:

1. A moving eye of the kind described comprising a hollow member of predetermined outline and having a front section of transparent material, an eyelid representation on said front section whereby a part thereof is rendered opaque, in simulation of an eyelash and an eyelid and an iris member loosely mounted in said hollow member and freely movable therein without restriction excepting as defined by the peripheral boundary of said hollow member.

2. A moving eye of the kind described comprising a disc shaped front section of transparent material, a disc shaped rear section connected with said front section to form a hollow circular member, an eyelid and eyelash produced upon said front section and partly covering the same in simulation of an eyelid and eyelash and an iris disc capable of freely rolling about in said hollow member in undefined movements limited only by the peripheral boundary of the hollow member.

3. The combination of a supporting element having eye sockets, moving eyes mounted in said sockets and each consisting of a hollow member of predetermined outline and having a front section of transparent material, an eyelid representation on said front section whereby a part thereof is rendered opaque, in simulation of an eyelash and an eyelid and an iris member loosely mounted in said hollow member and freely movable therein without limit excepting as defined by the peripheral boundary of said hollow member.

4. The combination of a toy figure having a head provided with eye sockets, moving eyes mounted in said sockets and each consisting of a disc shaped front section of transparent material, a disc shaped rear section connected with said front section to form a hollow circular member, an eyelid and eyelash produced upon said front section and partly covering the same in simulation of an eyelid and eyelash and an iris disc capable of freely rolling about in said hollow member in undefined movements limited only by the peripheral boundary of the hollow member.

5. A moving eye comprising a substantially flat back member, a transparent front member secured to said back member, said front and back member forming a chamber, a movable iris member in said chamber and freely rollable upon its peripheral edge in said chamber as the eye is moved, the upper edge of said front member being decorated imitative of an eyelid, said structure constituting a unitary button like device adapted with a like eye to be secured to the face of a doll to constitute eyes therefor.

6. A moving eye, comprising a hollow body, formed of two sections of pyroxylin, having the edges thereof overlapped to join the sections, one of said sections, constituting a front face, and being slightly curved and having a transparent portion and a colored portion, said colored portion representing an eyelid, a movable iris member in said hollow body adapted to move as the eye is turned.

7. An eye member for toys having, in combination, a pair of oppositely disposed discs spaced apart to form a chamber and with annular flanges thereon, one flange projecting into the other and connecting said discs together, one of said discs being transparent, and an iris member shiftably positioned in said chamber and visible through said transparent disc.

8. An eye member for toys having, in combination, a pair of oppositely disposed discs spaced apart to form a chamber and with annular flanges thereon, one flange projecting into the other and connecting said discs together, one of said discs being transparent, and an iris member shiftably positioned in said chamber and visible through said transparent disc, said transparent disc having the representation of an eyelid applied thereto.

9. A moving eye comprising a flattened shell having a portion of its front transparent and another portion thereof opaque to simulate an eyelid, an iris disk enclosed in said shell and freely movable therein in all lateral directions and adpted to disppear behind said opaque portion.

In testimony whereof I have hereunto set my hand.

RALPH A. FREUNDLICH.